(12) United States Patent
Leung

(10) Patent No.: US 6,215,497 B1
(45) Date of Patent: Apr. 10, 2001

(54) METHOD AND APPARATUS FOR MAXIMIZING THE RANDOM ACCESS BANDWIDTH OF A MULTI-BANK DRAM IN A COMPUTER GRAPHICS SYSTEM

(75) Inventor: Wingyu Leung, Cupertino, CA (US)

(73) Assignee: Monolithic System Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/133,475

(22) Filed: Aug. 12, 1998

(51) Int. Cl.[7] .................................................. G06T 17/00
(52) U.S. Cl. .............................................. 345/419; 345/512
(58) Field of Search ..................................... 345/418, 419, 345/503, 521, 512

(56) References Cited

U.S. PATENT DOCUMENTS

| | | |
|---|---|---|
| 5,249,282 | 9/1993 | Segers . |
| 5,949,439 * | 9/1999 | Ben-Yoseph et al. .............. 345/503 |
| 6,023,745 * | 2/2000 | Lu ............................................ 711/5 |
| 6,026,478 * | 2/2000 | Dowling ................................. 712/24 |
| 6,032,225 * | 2/2000 | Shiell et al. ........................ 711/117 |

* cited by examiner

Primary Examiner—Cliff N. Vo
(74) Attorney, Agent, or Firm—Bever, Hoffman & Harms, LLP; E. Eric Hoffman (57) ABSTRACT

A graphics sub-system having a 2-D graphics accelerator, a 3-D graphics accelerator and an embedded DRAM memory. The embedded DRAM memory serves as a frame buffer memory and/or a temporary storage memory for the 2-D graphics accelerator. The embedded DRAM memory also serves as a cache memory for the 3-D graphics accelerator or an external central processing unit (CPU). The embedded DRAM memory is logically divided into a plurality of independent banks, thereby resulting in a relatively fast average memory cycle time. More specifically, the embedded DRAM memory processes one transaction per clock cycle for accesses with no bank conflicts. The memory access time for any transaction (e.g., a bank-conflict access) is no greater than the memory cycle time plus the memory access time minus 1 clock cycle.

22 Claims, 8 Drawing Sheets

METHOD AND APPARATUS FOR MAXIMIZING THE RANDOM ACCESS BANDWIDTH OF A MULTI-BANK DRAM IN A COMPUTER GRAPHICS SYSTEM

FIELD OF THE INVENTION

The present invention is applicable in the field of digital data processing in which a dynamic random access memory (DRAM) is employed for storing digital information. In general, the present invention is used in an integrated circuit in which DRAM is embedded to provide data storage to support on-chip as well as off-chip data processing. The invention also relates to the application of embedded DRAM in the field of computer graphics.

DESCRIPTION OF RELATED ART

Conventional computer systems have used embedded DRAM in different manners. Embedded DRAM is defined as a DRAM that is physically embedded on a chip that includes a larger system, and whose purpose is to provide a memory function for the other components of the system in order to achieve the overall system objectives.

U.S. Pat. No. 5,249,282 by Segers describes a system that uses embedded DRAM as a cache memory. In this system, the embedded DRAM serves as a secondary cache to an on-chip central processing unit (CPU). However, because the embedded DRAM is logically configured as a single large array, the average DRAM cache access time is relatively long.

Another embedded DRAM system is described in an article entitled "NeoMagic Puts Graphics System in One Chip", Microprocessor Report, March 1995. This article describes a 1 Mbyte DRAM that is embedded in a chip with a 2-D graphics processor. The embedded DRAM serves as a display frame storage, and implements off-screen temporary storage. However, the embedded DRAM is a single large array, thereby causing the average DRAM access time to be relatively long.

As described above, embedded DRAM of conventional systems suffer the same relatively long access and memory cycle time as stand alone DRAM. The long access and memory cycle time results in low average bandwidth as the data bus is idle during most accesses while waiting for the memory data. One way to recover some of the lost bandwidth to idle is to take advantage of the spatial locality of the references of most accesses by using burst accesses (as exemplified by SDRAM or SGRAM). However, in an embedded DRAM environment, the on-chip data bus is typically very wide. As a result, the data associated with a conventional sequential burst access can typically be accessed in a single clock cycle in embedded DRAM, thereby making burst access of an embedded DRAM an unlikely event. This is especially true for graphics applications where multiple processing units with different spatial locality of references access the embedded DRAM simultaneously.

A DRAM using a multi-bank architecture to reduce the average access time is described in "A 32-bank 256-MB DRAM with Cache and TAG" by S. Tanoi et al., IEEE JSSC, vol. 29, No. 11, November 1994, pp. 1330–1335. In this scheme, the sense-amplifiers of some of the banks are used as cache memory to speed up the access at the expense of longer access time on cache miss access. The access control in the memory is also complicated by the addition of a TAG memory and a cache control circuit in each bank.

Another embedded DRAM is described in the article, "An Access-Sequence Control Scheme to Enhance Random-Access Performance of Embedded DRAM's", by K. Ayukawa et al., IEEE JSSC, vol. 33. No. 5, May 1998, pp. 800–806". This article proposes the use of multiple banks to reduce the average access time of the embedded DRAM. In this system, the embedded DRAM is accessed using a relatively complicated access control scheme that includes the use of a separate, dedicated data ID bus. This data ID bus is used to allow out-of-order accesses, thereby shortening the average DRAM access time. A memory is said to be able to handle out-of-order accesses if a second access transaction begins later than a first access transaction, and finishes before of the first access transaction. A write buffer having a depth of four entries is used to shorten the write access. However, the memory cycle time of the embedded DRAM is 7 clock periods, and there is no provision for handling the case where there are four or more consecutive page-miss write accesses when the write buffer is overrun.

Therefore it is desirable to have an embedded DRAM which can support random accesses at a rate that approaches one access per clock cycle (like an SRAM), without incurring the burden of having to handle out-of-order accesses. Such an embedded DRAM would be particularly useful in graphics applications.

SUMMARY

Accordingly the present invention provides a graphics sub-system having a 2-D graphics accelerator, a 3-D graphics accelerator and an embedded DRAM memory. The embedded DRAM memory serves as a frame buffer memory and/or a temporary storage memory for the 2-D graphics accelerator. The embedded DRAM memory also serves as a cache memory for the 3-D graphics accelerator.

The embedded DRAM memory is logically divided into a plurality of independent banks, thereby allowing parallel operations in multiple banks, and resulting in a relatively fast average memory cycle time. More specifically, the embedded DRAM memory processes one transaction per clock cycle for accesses with no bank conflicts. The maximum memory access time for any transaction (e.g., a bank-conflict access) is equal to memory cycle time plus the memory access time minus 1 clock cycle.

The present invention will be more fully understood in view of the following description and drawings.

DETAILED DESCRIPTION

Figure 1:
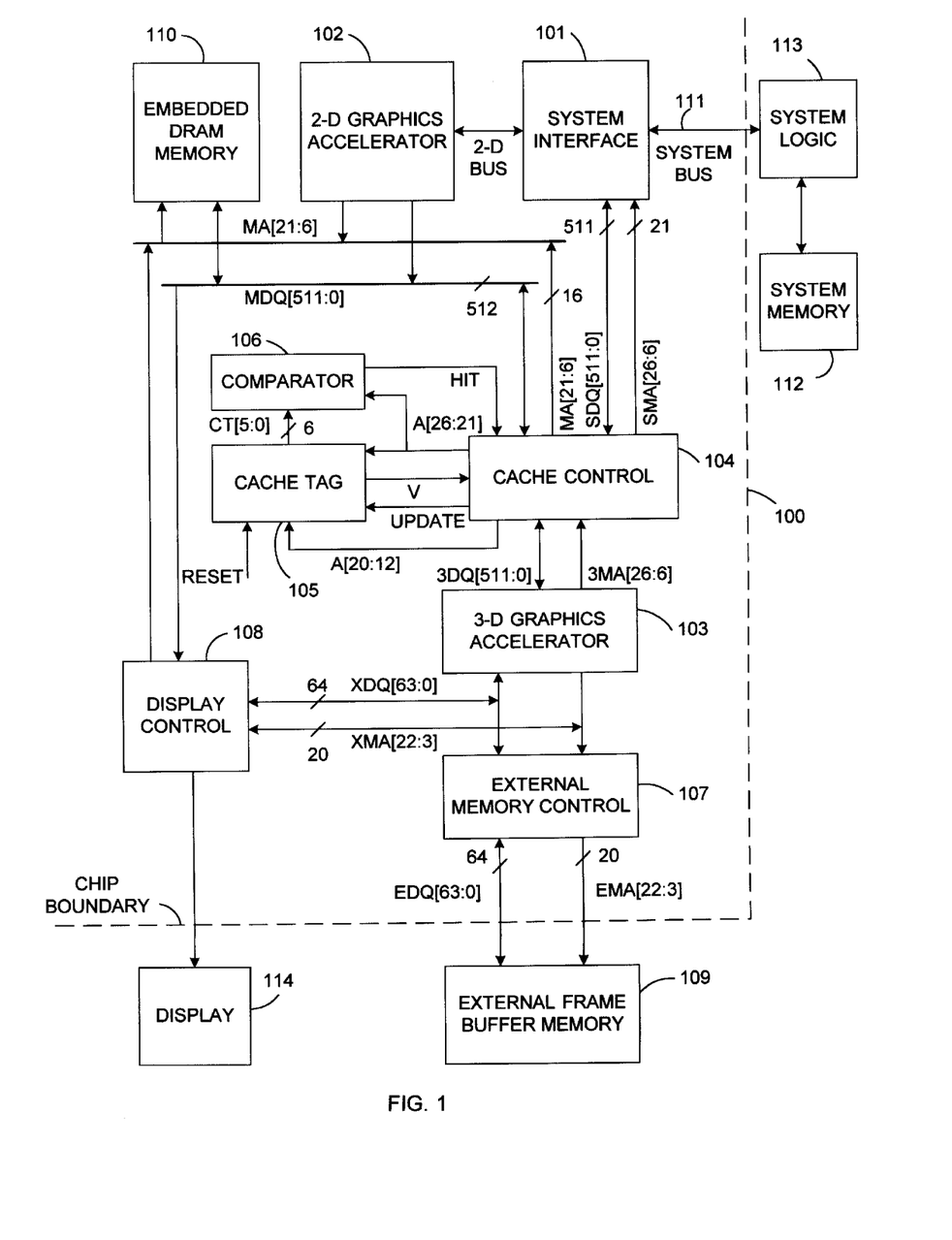
FIG. 1 is a block diagram of a graphics sub-system in accordance with one embodiment of the present invention.

FIG. 1 is a block diagram of a graphics sub-system 100 in accordance with one embodiment of the present invention. In general, graphics sub-system 100 accelerates the rendering of raster graphics for both 2-D and 3-D applications. Graphics sub-system 100 includes system interface 101, 2-D graphics accelerator 102, 3-D graphics accelerator 103, cache controller 104, cache tag memory 105, comparator 106, external memory control 107, display controller 108 and multi-bank embedded dynamic random access memory (DRAM) 110. In the described embodiment, graphics sub-system 100 is fabricated on a single integrated circuit chip. In other embodiments, other functional blocks such as a video processing circuit, a color look-up table and a video digital-to-analog (DAC) decoder may also be incorporated on the same chip as graphics sub-system 100. Graphics sub-system 100 is coupled to external circuitry, including an external frame buffer memory 109, a system memory 112, system logic 113 and a video display terminal 114.

System interface 101 provides a connection to a system bus 111, thereby enabling graphics sub-system 100 to receive data and address information from system memory 112 through system logic 113. In the described embodiment, system interface 101 and system bus 111 observe the specifications of AGP (Accelerated Graphics Port Interface Specification, Rev. 1.0, Intel Corporation, Jul. 31st, 1996).

In general, graphics sub-system 100 is configured to operate in either a 2-D graphics accelerator mode or a 3-D graphics accelerator mode. Under normal operations, 2-D accelerator 102 and 3-D accelerator 103 are never operating simultaneously. When graphics sub-system 100 is operating as in the 2-D graphics accelerator mode, 2-D accelerator 102 is enabled, and 3-D graphics accelerator 103 is disabled. Conversely, when graphics sub-system 100 is operating in the 3-D graphics accelerator mode, 3-D accelerator 103 is enabled, and 2-D graphics accelerator 102 is disabled.

As described in more detail below, when graphics sub-system 100 is in the 2-D graphics accelerator mode, embedded DRAM 110 is operated as a display frame buffer or as a temporary off-screen temporary storage location. When graphics sub-system 100 is in the 3-D graphics accelerator mode, embedded DRAM 110 is operated as a cache memory for 3-D graphics accelerator 103, thereby providing fast access to the most frequently or most recently accessed texture, and other data necessary for 3-D rendering. In the absence of such a cache memory, this data is normally stored in system memory 112, and is accessed through system interface 101.

System interface 101 operably couples system bus 111 to a 2-D bus, a 512-bit wide internal data bus SDQ, and a 21-bit wide internal address bus SMA. The 2-D bus is further coupled to 2-D graphics accelerator 102. The 2-D bus is used to transfer data, address and control information to 2-D graphics accelerator 102. Data bus SDQ and address bus SMA are coupled to cache controller 104. In general, data values SDQ[511:0] are transferred between cache controller 104 and system bus 111 through data bus SDQ and system interface 101. Similarly, address signals SMA[26:6] are transferred from cache controller 104 to system bus 111 through address bus SMA and system interface 101. In this manner, cache controller 104 is able to control data transfer from system memory 112 to 3-D accelerator 103 and embedded DRAM memory 110.

Cache controller 104 is further coupled to a 512-bit wide data bus MDQ and a 16-bit wide address bus MDA. Data bus MDQ and address bus MDA are also coupled to 2-D graphics accelerator 102, embedded DRAM memory 110 and display controller 108. Data bus MDQ and address bus MDA carry data signals MDQ[511:0] and address signals MA[21:6], respectively, in a manner described in more detail below.

Cache controller 104 is also coupled to cache tag memory 105 and comparator 106 by a 14-bit address bus A, a 1-bit update control line and a 1-bit hit control line. Cache tag memory 105 and comparator 106 are coupled by a 6-bit address bus CT. More specifically, address signals A[26:21] are routed from cache controller 104 to cache tag memory 105 and comparator 106 on address bus A. Address signals A[20:12] are routed from cache controller 104 to cache tag memory 105 on address bus A. An UPDATE control signal is routed from cache controller 105 to cache tag 105 on the update control line, and a HIT control signal is routed from comparator 106 to cache controller 104 on the hit control line. A 6-bit cache address CT[5:0] is routed from cache tag memory 105 to comparator 106. The operation of cache controller 104, cache tag memory 105 and comparator 106 are described in more detail below.

Cache controller 104 is also coupled to 3-D graphics accelerator 103 by 512-bit wide data bus 3DQ and 21-bit wide address bus 3MA. Data bus 3DQ and address bus 3MA carry data signals 3DQ[512:0] and address signals 3MA[26:6], respectively, in a manner described in more detail below.

3-D graphics accelerator 103 is further coupled to a 64-bit wide data bus XDQ and a 20-bit wide address bus XDA. Data bus XDQ and address bus XDA are also coupled to external memory control 107 and display controller 108. Data bus XDQ and address bus XDA carry data signals XDQ[63:0] and address signals XMA[22:3], respectively, in a manner described in more detail below.

External memory controller 107 is further coupled to external frame buffer memory 109 by a 64-bit wide data bus EDQ and a 20-bit wide address bus EMA. Data bus EDQ and address bus EDA carry data signals EDQ[63:0] and address signals EMA[22:3], respectively, in a manner described in more detail below.

3-D Graphics Acceleration Mode

In the 3-D mode, 2-D graphics accelerator 102 is disabled, 3-D graphics accelerator 103 is enabled, and embedded DRAM memory 110 is used as a cache to system memory 112. In the described embodiment, 3-D graphics accelerator 103 is a conventional circuit that accesses data values stored in system memory 112 or in embedded DRAM memory 110. 3-D graphics accelerator 103 processes these data values in accordance with well-known processing techniques, thereby generating a plurality of display data values that represent frames of video information. These display data values are stored in external frame buffer memory 109 under the control of external memory controller 107. External frame buffer memory 109 typically stores one to two frames of display data values. More specifically, 64-bit display data values are routed from 3-D graphics accelerator 103 to external memory controller 107 on data bus XDQ, with the address values associated with these display data values are routed on address bus XMA. External memory controller 107 then transmits these display data values and associated address values to external frame buffer memory 109 on data bus EDQ and address bus EMA.

Display controller 108 retrieves display data values from external frame buffer memory 109 (through external memory controller 107) and transmits these display data values to video display terminal 114, thereby controlling the screen refresh operation. Display data values are transmitted from external frame buffer memory 109 to display controller 108 on data buses XDQ and EDQ. Similarly, address values are transferred between external frame buffer memory 109 and display controller 108 on address buses XMA and EMA.

In another embodiment, external frame buffer memory 109 is implemented in system memory 112 and display controller 108 accesses system memory 112 through system interface 101 and the on-chip system bus, which includes data bus SDQ and address bus SMA.

In the described embodiment, all data transferred between 3-D graphics accelerator 103 and either system memory 112 or embedded DRAM memory 110 is routed through cache controller 104. In order to understand the operation of cache controller 104, embedded DRAM memory 110 and system memory 112 must be described in more detail.

Figure 2:
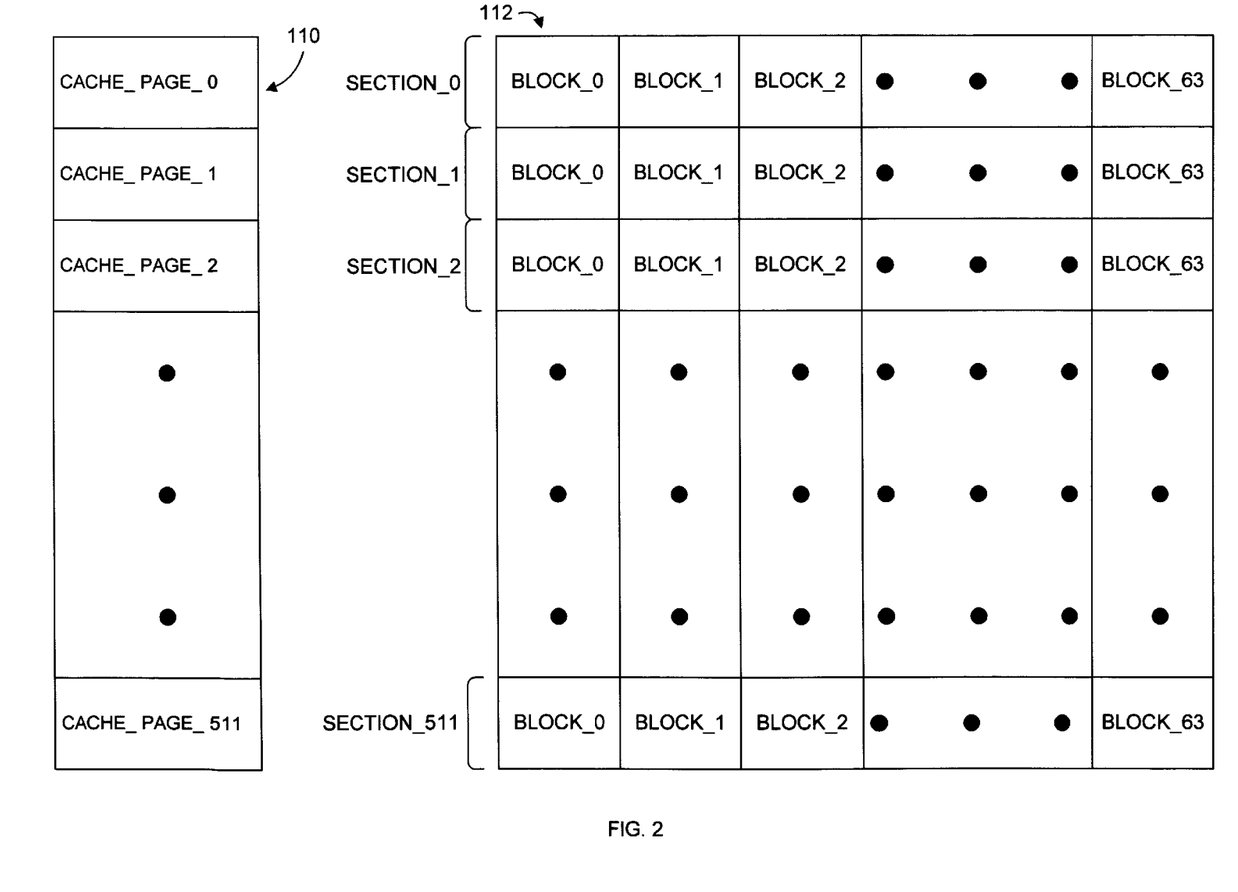
FIG. 2 is a schematic diagram illustrating the logical division of an embedded DRAM memory and a system memory in a 3-D graphics acceleration mode in accordance with one embodiment of the present invention.

FIG. 2 is a schematic diagram illustrating the logical division of embedded DRAM memory 110 and system memory 112 in the 3-D mode in accordance with one embodiment of the present invention. As described in more detail below, embedded DRAM memory 110 has a capacity of 2.5 Mbytes, which is provided by 20 DRAM banks. In the 3-D mode, 2 Mbytes ($2^{21}$ bytes or 16 banks) of embedded DRAM memory 110 is used as cache memory (and the remaining 0.5 Mbyte is unused). The 2 Mbyte cache memory is divided into 512 cache pages, each cache page having 4 Kbytes. These cache pages (Cache_Page_0–Cache_Page_511) are illustrated in FIG. 2.

In the described embodiment, system memory 112 has a maximum capacity of 128 Mbytes ($2^{27}$ bytes). The cache system uses direct mapping. Thus, system memory 112 is divided into 512 sections (Section_0–Section_511). Each section has 64 blocks (i.e., Block_0–Block_63), with each block having a capacity of 4 Kbytes. Each cache page therefore has the same capacity as each system memory block. Each cache page corresponds with one of the sections in system memory 112. For example, Cache_Page_0 corresponds with Section_0 and Cache_Page_1 corresponds with Section_1. Each cache page stores data from one of the 64 blocks in its corresponding section. For example, Cache_Page_0 stores data from one of the 64 blocks in Section_0, and Cache_Page_1 stores data from one of the 64 blocks in Section_1.

Cache tag memory 105 includes 512 entries, each of these entries being associated with a corresponding one of the 512 cache pages. Each entry of cache tag memory 105 contains two fields: a 6-bit address field and a 1-bit valid field. The address field is 6-bits wide, thereby enabling each entry to identify the block associated with the cache page. For example, if Cache_Page_0 is storing the data of Block_2 of Section_0, then the cache tag entry associated with Cache_Page_0 would store a 6-bit value equal to "000010", or a binary "2" value, thereby identifying Block_2. The valid bit indicates whether the current entry is valid. During system reset, the valid bit of each entry is reset to zero, thereby invalidating all the cache entries.

A read access, as performed by 3-D graphics accelerator 103, will now be described in more detail. 3-D accelerator 103 transmits a system memory address 3MA[26:6] associated with the desired data values to cache controller 104 on address bus 3MA. Bits 3MA[20:12] correspond with the section of system memory 112 to be accessed. Bits 3MA[26:21] correspond with the block to be accessed within the addressed section. 3-D accelerator 103 also transmits a control signal (not shown), that indicates to cache controller 104 that the desired access is a read access. In response, cache controller 104 accesses cache tag memory 105 to determine whether a cache hit or a cache miss occurs.

Initially, all entries in cache tag memory 105 are invalidated, so that a cache miss occurs. As a result, cache controller 104 accesses system memory 112 by transmitting the address signals 3MA[26:6] to system memory 112 as address signals SMA[26:6]. System memory 112 accesses the addressed section and block in response to address signals SMA[26:6]. In the present example, it is assumed that address signals SMA[26:6] identify Section_2, Block_8 of system memory 112. As a result, all of the data values in Section_2, Block_8 are transmitted from system memory 112, through system interface 101, to cache controller 104. Cache controller 104, in turn, transmits these data values to embedded DRAM memory 110 on data bus MDQ. Embedded DRAM memory 110 stores these data values in Cache_Page_2. Cache controller 104 also provides the requested data values to 3-D graphics accelerator 103.

In addition, cache controller 104 provides the address signals representative of Cache_Page_2 to cache tag memory 105 (as address signals A[20:12]). Cache controller also provides the address signals identifying Block_8 to cache tag memory 105 (as address signals A[26:21]). Cache controller 104 further asserts the UPDATE signal, thereby causing the address signals identifying Block_8 to be written to the address field of the cache tag entry corresponding to Cache_Page_2, and setting the associated valid bit to a logic "1" value. At this time, cache tag memory 105 stores information that identifies the contents of embedded DRAM memory 110.

If a subsequent read access of 3-D graphics accelerator 103 requests data from Section_2, Block_8 of system memory 112, then a cache hit will occur (assuming that the above-described cache tag entry has not been overwritten in the meantime). As a result, cache controller 104 will retrieve the desired data value from embedded DRAM memory 110 (and not system memory 112). Retrieving data values from DRAM memory 110 is much faster than retrieving data values from system memory 112, because DRAM memory 110 is located on the same chip as 3-D graphics accelerator 103, and because embedded DRAM memory 110 has a much faster access time than system memory 112 in general.

Cache controller 104 accesses embedded DRAM memory 110 as follows. Again, 3-D graphics controller 103 provides an address 3MA[26:6] and a read enable signal to cache controller 104. In the described example, address signals SMA[26:6] identify Section_2, Block_8 of system memory 112. Address signals SMA[20:12], which are representative of Section_2, as well as Cache_Page_2, are transmitted to cache tag memory 105. In response, cache tag memory 105 provides the contents of the cache tag entry corresponding to Cache_Page_2 to comparator 106. In the present example, cache tag memory 105 provides an address representative of Block_8. Cache controller 104 also provides the address values identifying the block requested by the current access (i.e., Block_8) to comparator 106 as address signals A[26:21]. In response to the matched address signals, comparator 106 asserts the HIT signal, thereby informing cache controller 104 to access embedded DRAM memory 110 instead of system memory 112.

If a subsequent read access addresses a different block of Section_2, this block is retrieved, and embedded DRAM memory 110 and cache tag memory 105 are updated to reflect the newly retrieved block.

Note that for all read accesses, cache controller 104 first accesses embedded DRAM (cache) memory 110. In the case of a miss, system memory 112 is then accessed. This is commonly referred as "look-through" arrangement, in which the 3-D accelerator looks through DRAM (cache) memory 110 to system memory 112. In another embodiment, commonly referred as "look-aside", read requests are broadcast to both cache controller 104 and system memory 112 simultaneously. In case of a cache hit, data is routed from embedded DRAM memory 110 to 3-D graphics accelerator 103. In case of a cache miss, a write request is generated to embedded DRAM memory 110 and the data read from system memory 112 is routed to both embedded DRAM memory 110 and 3-D graphics accelerator 103.

During its normal operation, 3-D graphics accelerator 103 also initiates write transfers to system memory 112 or embedded DRAM memory 110. A write-through policy is employed for embedded DRAM memory 110 when this memory is used as a cache memory. In a write-through policy, both embedded DRAM memory 110 and system memory 112 are written with the same data simultaneously when there is a cache hit. In case of a cache miss, only system memory 112 is written; no allocation or cache page replacement is carried out.

Another embodiment implements a write-back policy, in which write data is written first to embedded DRAM memory 110 irrespective of a cache hit or miss. In case of a miss, a cache page in embedded DRAM memory 110 is allocated for the new data. System memory 112 is updated when the modified cache page is replaced.

Figure 3:
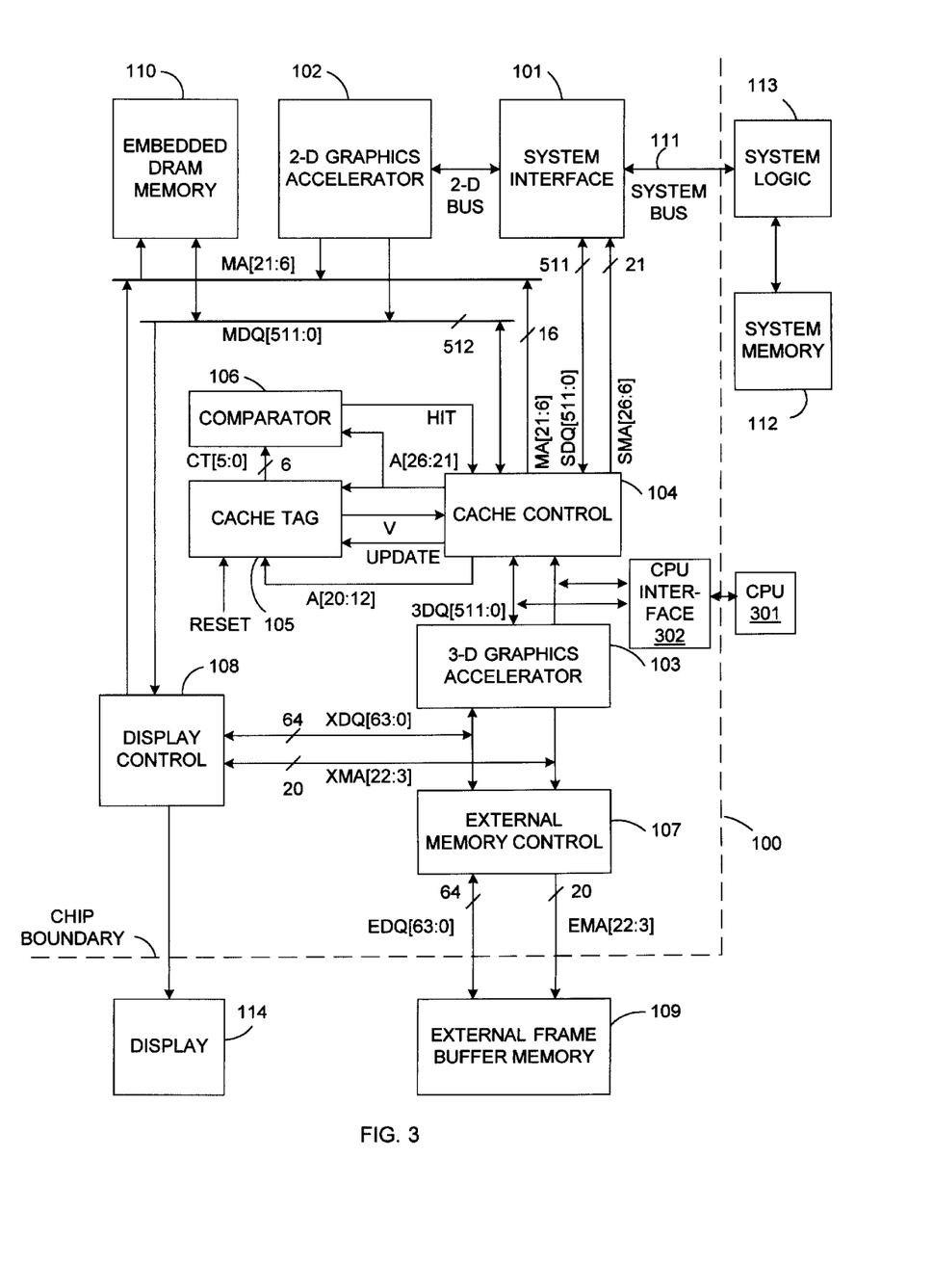
FIG. 3 is a block diagram of a graphics sub-system in accordance with another embodiment of the present invention.

FIG. 3 shows another embodiment of the present invention. A CPU (Central Processing Unit) interface 302 is provided to facilitate the communication between a CPU 301 and system memory 112, with embedded DRAM memory 110 serving as a cache to system memory 112. In this configuration, embedded DRAM memory 110 is a common unified cache memory that is shared between CPU 301 and 3-D graphics accelerator 103. One advantage of a unified cache memory is that the data in the cache memory is inherently coherent to both CPU 301 and 3-D graphics accelerator 103. Another advantage of this configuration is that CPU 301 and 3-D graphics accelerator 103 can share the tasks of 3-D rendering.

2-D Graphics Acceleration Mode

In the 2-D mode, 3-D graphics accelerator 103 is disabled, 2-D graphics accelerator 102 is enabled, and embedded DRAM memory 110 is used as a frame buffer memory for 2-D graphics accelerator 102, or as a temporary off-screen temporary storage location. In the described embodiment, 2-D graphics accelerator 102 is a conventional circuit that accesses data values stored in system memory 112 or in embedded DRAM memory 110. 2-D graphics accelerator 102 processes these data values in accordance with well-known processing techniques, thereby generating a plurality of display data values that represent frames of video information. These display data values are stored in embedded DRAM memory 102 under the control of 2-D graphics accelerator 102. In 2-D mode, embedded DRAM memory 110 typically stores one frame of display data values. More specifically, 512-bit display data values are routed from 2-D graphics accelerator 102 to embedded DRAM memory 110 on data bus MDQ, with the address values associated with these display data values being routed on address bus MA. Display controller 108 retrieves display data values from embedded DRAM memory 110 and transmits these display data values to video display terminal 114, which may include color look-up-tables and video DACs, thereby controlling the creen refresh operation. Display data values are transmitted from embedded DRAM memory 110 to display controller 108 on data bus MDQ. Similarly, address values are transferred between embedded DRAM memory 110 and display controller 108 on address bus MA.

Embedded DRAM

Figure 4:
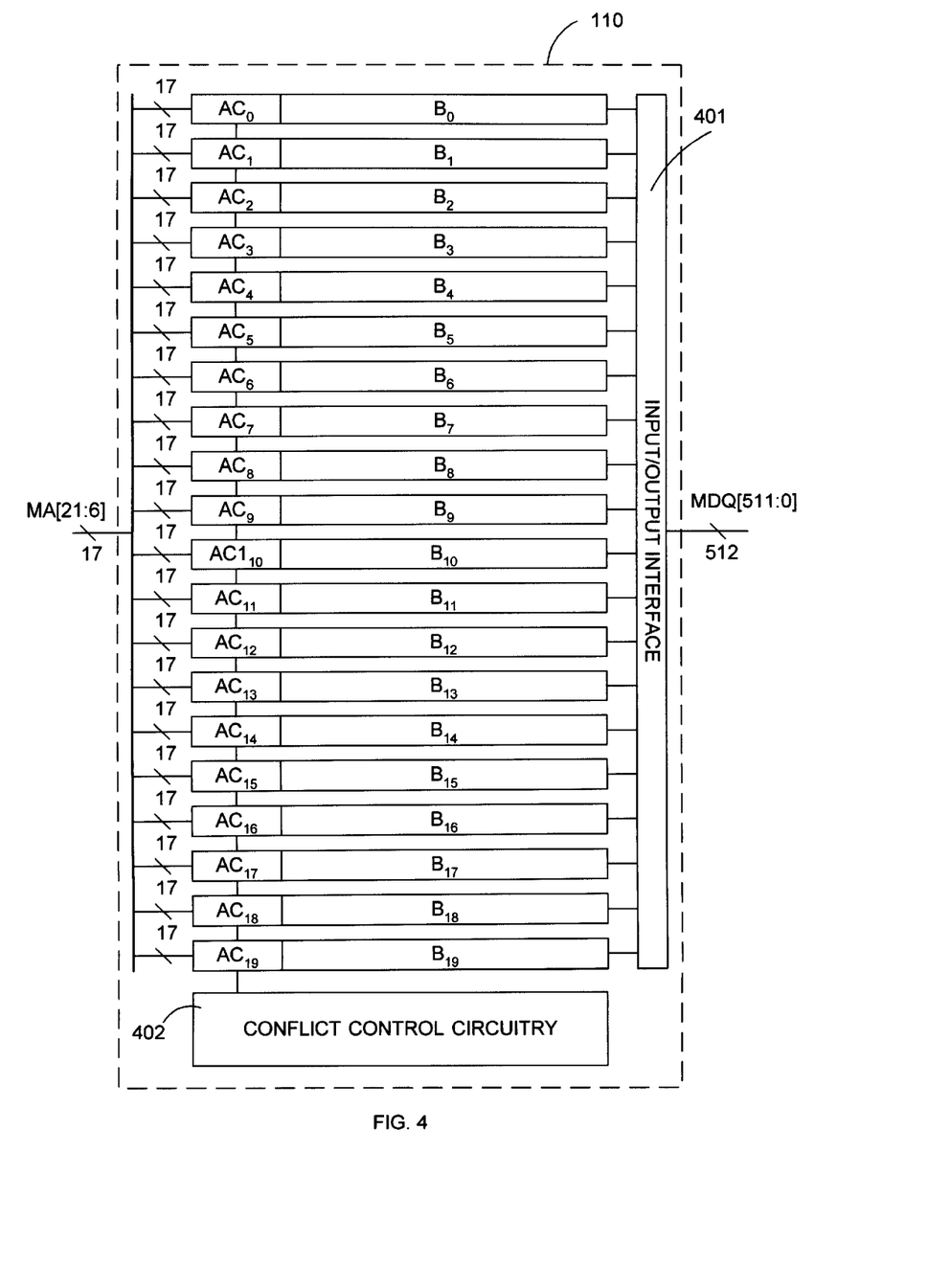
FIG. 4 is a block diagram illustrating an embedded DRAM memory used in a graphics sub-system in accordance with one embodiment of the present invention.

Embedded DRAM memory 110 will now be described in more detail. FIG. 4 is a block diagram illustrating embedded DRAM memory 110. Embedded DRAM memory 110 includes twenty banks, $B_0$ to $B_{19}$, twenty access control circuits $AC_0$ to $AC_{19}$, input/output interface 401 and conflict control circuit 402. Each bank has an associated access control circuit. Thus, banks $B_0$–$B_{19}$ are associated with access control circuits $AC_0$–$AC_{19}$, respectively. Conflict control circuit 402 controls access control circuits $AC_0$–$AC_{19}$ in the manner described below.

Each of banks $B_0$–$B_{19}$ includes a 1 Mbit array of DRAM cells arranged in 256 rows and 4096 columns. In the 2-D mode, the entire capacity of banks B0–B19 are used (i.e., 20 Mbits, or 2.5 Mbytes). As described above, in the 3-D mode, only the capacity of banks $B_0$–$B_{15}$ are used (i.e., 16 Mbits, or 2 Mbytes).

In the described embodiment, the address unit is 1 byte, the word size of embedded DRAM 110 is 32 bytes, and the word size of system memory 112 is 8 bytes. Byte level write operations to embedded DRAM memory 110 and system memory 112 are controlled using byte mask address signals (not shown). In general, these byte mask address signals are the lower 6 address bits [5:0] of address signals SMA[26:6], 3MA[26:6] and MA[21:6].

One of the advantages of embedded DRAM memory 110 is its inherently large data bandwidth as illustrated by the 512 bit data bus MDQ, which connects the embedded memory to the other functional blocks.

Each of access control circuits $AC_0$–$AC_{19}$ has its own address latches, a bank identification register which contains the bank identification, and memory control timing sequencer so that each of the associated banks $B_0$–$B_{19}$ can operate independent of the other banks. All of the memory banks $B_0$–$B_{19}$ share a common data bus MDQ.

Figure 5:
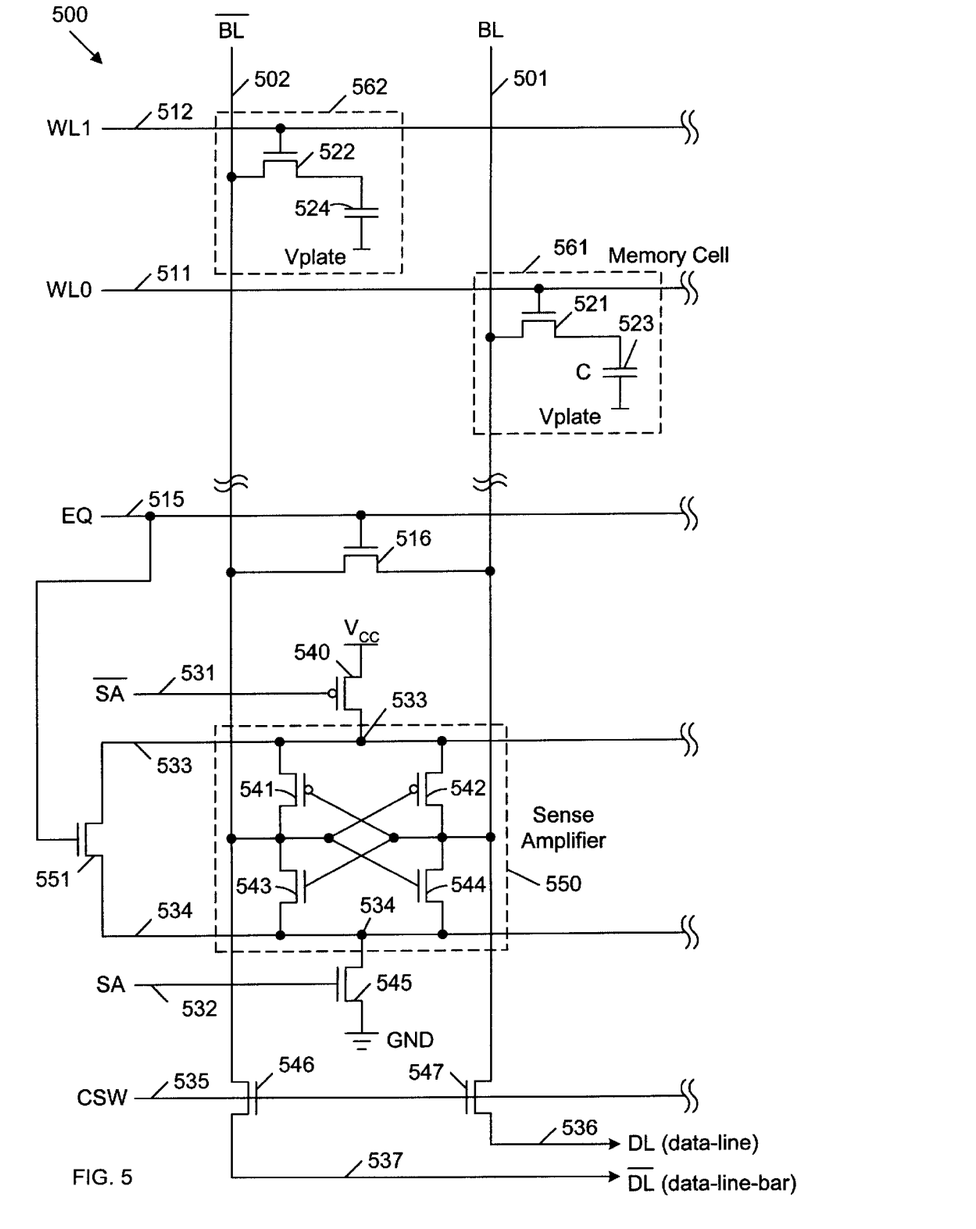
FIG. 5 is a circuit diagram of the column structure of a memory bank in accordance with one embodiment of the present invention.

FIG. 5 is a circuit diagram illustrating a column structure 500 of an exemplary memory bank. Column structure 500 includes bit lines 501 and 502, word lines 511 and 512, memory cell transistors 521–522, memory cell capacitors 523–524, equalization line 515, equalization transistor 516, sense amplifier control lines 531–534, column switch line 535, data lines 536–537, sense amplifier transistors 540–545, column select transistors 546–547, and sense amplifier equalization transistor 551. Transistor 521 and capacitor 523 form memory cell 561, and transistor 522 and capacitor 524 form memory cell 562, as illustrated. Transistors 541–544 are connected to form regenerative latches which are used as a sense amplifier 550. Sense amplifier 550 is coupled to voltage supplies $V_{cc}$ and ground through transistors 540 and 545, respectively.

Column structure 500 is accessed in a self-timed manner in response to a clock signal, a row access signal RAS#, a row address signal, a column address signal, and a bank address signal. On the rising edge of the clock signal, the bank address is compared with the bank identification number in the bank identification register. A match in the comparison causes the row and column addresses to be latched in an address latch. The RAS# signal is sampled on each rising edge of the clock signal. Upon detecting a logic low RAS# signal (and a match in the bank address comparison), the normally high equalization signal EQ on equalization line 515 is driven to a logic low voltage, thereby turning off both bit line equalization transistor 516 and sense amplifier equalization transistor 551. At the same time, the row address signal is decoded. When the row address signal has been decoded, word line signal WL0 is asserted high, thereby turning on word line 511 (assuming that the row address signal corresponds with word line 511). At this time, a voltage differential is developed across bit lines 501 and 502.

Sense amplifier signals SA and SA# are asserted high and low, respectively, in response to the subsequent falling edge of the clock signal, thereby activating sense amplifier 550. The activation of sense amplifier 50 causes the data value on bit lines 501 and 502 to be latched in sense amplifier 50.

The column address decoding operation is initiated by the next rising edge of the clock signal. When the column address has been decoded, a column switch signal CSW is asserted high, thereby turning on transistors 546 and 547 (assuming that column structure 500 is identified by the column address signal). At this time, the addressed data is provided on complementary data lines 536 and 537.

The complimentary data lines 536 and 537 are connected to seven other column structures similar to column structure 500. These seven other column structures are controlled by seven other column select signals, thereby forming an 8-to-1 column multiplexer. This 8-to-1 column multiplexer allows 512 of the 4096 columns of a bank to be selected. As described in more detail below, complementary data lines 536 and 537 are connected to input/output interface 401.

The above-described access of column structure 500 takes three clock cycles to complete. That is, memory cycle time equals 3 clock periods. Each of memory banks $B_0$–$B_{19}$ generates its own timing signals EQ, SA, and CSW in the manner described above. The RAS# signal is generated by conflict control circuit 402 in the manner described below. The operation of column structure 500 is described in more detail in U.S. Pat. No. 5,675,169, which is hereby incorporated by reference.

Figure 6:
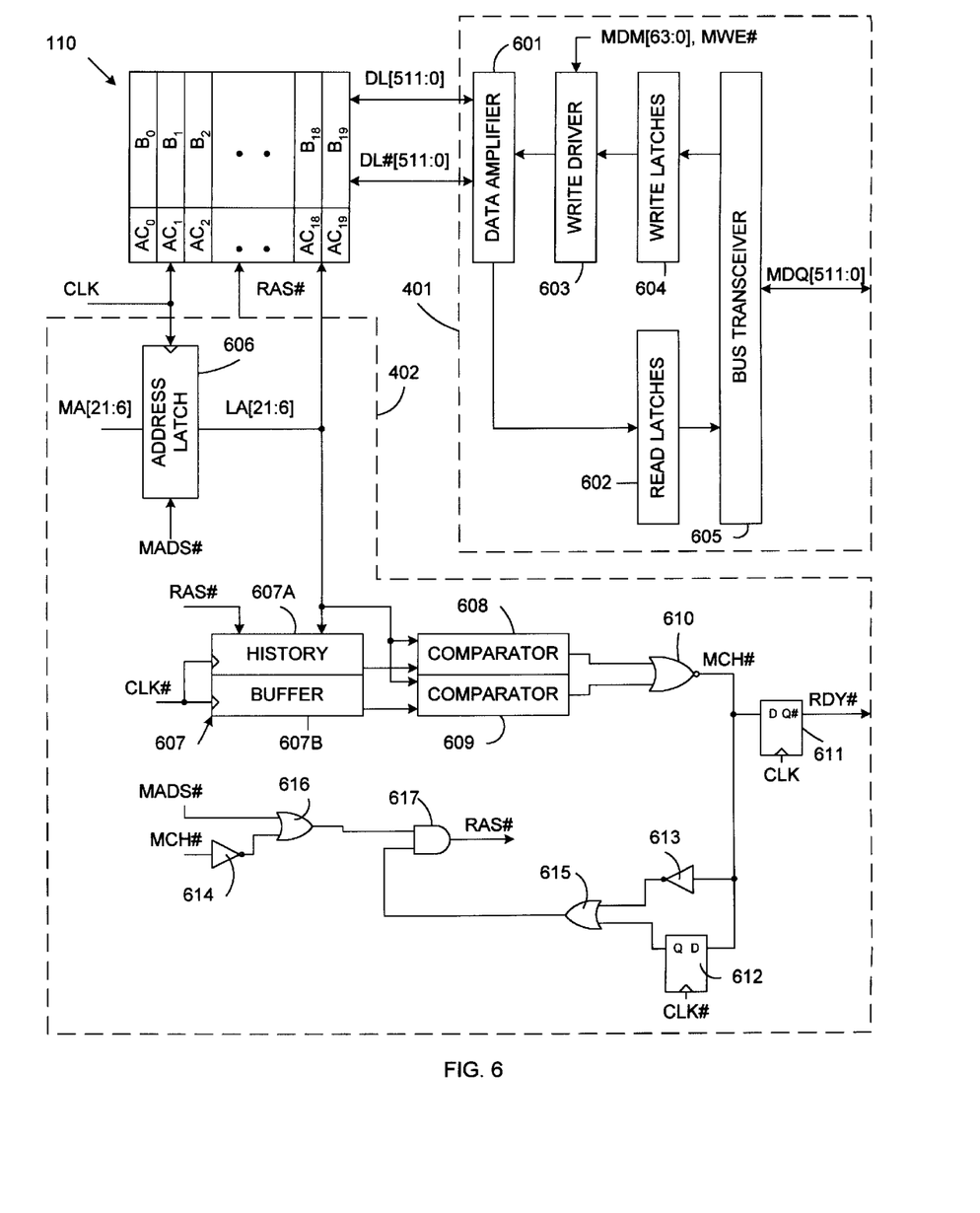
FIG. 6 is a schematic diagram an embedded DRAM memory in accordance with one embodiment of the present invention.

FIG. 6 is a schematic diagram of embedded DRAM memory 110 in accordance with one embodiment of the invention. Input/output interface 401 includes data amplifier 601, read latches 602, write driver 603, write latches 604 and bus transceiver 605. Conflict control circuit 402 includes address latch 606, history buffer 607 (which includes registers 607A and 607B), comparators 608–609, NOR gate 610, flip-flops 611–612, inverters 613–614, OR gates 615–616 and AND gate 617.

Input/output interface 401 will first be described. The output data lines DL[511:0] and DL#[511:0] are coupled to data amplifier 601 as illustrated. Data amplifier 601 includes 512 amplifier circuits, which amplify the output signals received from the selected sense amplifiers in embedded DRAM memory 110. Data amplifier 601 is coupled to read latches 602. Read latches 602 include 512 latches for receiving and storing the data values provided by data amplifier 601. Read latches 602 provide 512 output signals to bus transceiver 605, which in turn, transmits these output signals as data signals MDQ[511:0] on data bus MDQ.

Write data values are provided to bus transceiver 605 on data bus MDQ. These write data values are transmitted from bus transceiver 605 to write latches 604. Write latches 604 include 512 latches for storing the write data values received from bus transceiver 605. Write latches 604 are coupled to provide the write data values to write driver 603. Write driver 603 provides the data values to be written to data amplifier 603. Write driver 603 includes 512 tri-state buffers that are controlled by a read/write indicator signal MWE# and a write mask signal MDM[63:0]. The MWE# signal is driven by a memory client (e.g., 2-D accelerator 102 or 3-D accelerator 103) at the beginning of a memory transaction, thereby indicating whether the transaction is a read or a write operation. For a write operation, MWE# is driven low and for a read operation, MWE# is driven high. A logic low write enable signal MWE# enables write drivers 603, while the write mask signal MDM[63:0] enables and disables selected tri-state buffers, thereby providing a byte level write capability. The tri-state buffers in write driver 603 are disabled (i.e., in a high-impedance state) during read operations.

In another embodiment, data amplifier 601 is coupled to a pre-fetched read buffer and write driver 603 is coupled to a posted write buffer, in the manner described in commonly owned, co-pending U.S. patent application Ser. No. 08/679,873, which is hereby incorporated by reference. In this embodiment, the pre-fetched read buffer is coupled to a bus receiver that connects to a 128-bit read data bus. The posted write buffer is coupled to a bus driver that connects to a 128-bit write data bus. The read and write data buses are uni-directional and they couple embedded DRAM memory 110 to the other functional blocks. The data transfer frequency of the read and write data buses is twice that of the 512-bit bi-directional bus internal to the memory array. One advantage of an embodiment using dedicated read and write buses is the that timing overhead associated with bus turn-around is avoided.

Turning now to conflict control circuit 402, address latch 606 is coupled to receive address signals MA[21:6] from address bus MA. Address latch 606 is also coupled to receive an address strobe signal LAT and a clock signal CLK. The address strobe signal LAT is generated in response to an external address strobe signal MADS# and a internal match signal MCH#. In general, the address strobe signal MADS# informs memory 110 of the presence of a new memory transaction. The address signals MA[21:6] are loaded into address latch 606 as latched address signals LA[16:6] in response to a logic low address strobe signal LAT, and a rising edge of the clock signal CLK. The memory address is mapped as follows: LA[21:17] identifies the bank address, LA[16:9] identifies the row address, and LA[8:6] identifies the column address. The clock signal CLK, row access signal RAS# and latched address signals LA[21:6] are provided to the access control circuits $AC_0$–$AC_{19}$. In response, these access control signals generate the appropriate access signals as described above in connection with FIG. 5.

Unlike conventional DRAM, which uses multiplexed row and column addresses on the same set of address lines, embedded DRAM memory 110 receives all the addresses (i.e., bank, row, column) in the same clock cycle. As described above, address latch 606 latches these addresses at the rising edge of the CLK signal when the LAT signal is detected low. Each of memory banks $B_0$–$B_{19}$ has its own access control circuit, thereby facilitating parallel multi-bank operations in which one bank is in the row address decoding state, another bank is in the read or write state, and yet another bank is in the beginning of the pre-charge state. Operating banks $B_0$–$B_{19}$ in parallel allows pipelined random accessing to different banks. As a result, one address can be input per cycle of the CLK signal for non-conflicting bank accesses. Non-conflicting bank accesses occur as long as none of the accesses within a three clock cycle period are addressed to the same bank. If the same bank is accessed more than once during any three clock cycle period, a bank-conflict exists because the accessed bank is not ready for handling the row access. Consequently, consecutive accesses to any one bank are not allowed unless the accesses are separated by three clock cycles or longer.

For example, if bank $B_0$ is accessed at clock cycle n, then bank $B_0$ cannot begin to perform another access transaction until beginning of clock cycle n+3. Since the embedded DRAM memory 110 consists of 20 banks (16 banks during 3-D mode) and the cycle time of each individual memory bank is 3 clock cycles, the probability of bank conflict (accesses to the same bank within 3 clock cycles), is approximately 3/20 or 15%. Therefore, the average access cycle time for the memory is (0.15×3)+0.85 clock cycles, or 1.3 clock cycles.

Embedded DRAM memory 110 therefore behaves very much like a synchronous SRAM which can support close to one random access per clock cycle.

Returning now to FIG. 6, conflict control circuit 402 responds to non-conflict accesses and bank conflict accesses as follows. The latched address signal LA[21:17] is stored in register 607A of history buffer 607 on the following falling edge of the CLK signal after the RAS# signal is detected low. At the same time, the address signal previously stored in register 607A is transferred to register 607B of history register 607. Thus, history buffer 607 is a two entry first in, first out (FIFO) memory.

Note that the contents of address latch 606, register 607A and register 607B represent the access addresses of a current access, an access occurring one memory cycle ago, and an access occurring two memory cycles ago, respectively. If the contents of address latch 606 match the contents of register 607A, then the current access is directed to the same bank as the previous access (bank-conflict), and the current access must be delayed for at least two clock cycles. Similarly, if the contents of address latch 606 match the contents of register 607B, then the current access is directed to the same bank as the access occurring two memory cycles ago, and the current access must be delayed for at least one clock cycle.

Comparator 608 is coupled to receive the addresses stored in address latch 606 and register 607A. Comparator 609 is coupled to receive the addresses stored by address latch 606 and register 607B. Upon detecting a match, comparators 608 and 609 assert logic high signals, which are applied to NOR gate 610. NOR gate 610 asserts a logic low match signal MCH# when either of comparators 608 and 609 asserts a logic high signal. The logic low match signal MCH# therefore indicates that a bank conflict transaction is pending. As described in more detail below, the logic low MCH# signal is used to delay access to DRAM memory 110, when required.

The logic low MCH# signal is latched into flip flop 611 in response to the rising edge of the CLK signal. As a result, flip flop 611 provides a logic high ready control signal RDY# at its Q# output terminal. The logic high RDY# signal indicates to the accessing client (e.g., 2-D graphics accelerator 102 or 3-D graphics accelerator 103) that DRAM memory 110 is not yet ready for any further accesses. As a result, the system accessing DRAM array (e.g., 2-D accelerator 102 or 3-D accelerator 103) does not initiate any further accesses until the RDY# signal transitions to a logic low value. The logic low RDY# signal indicates that memory 110 is ready to receive another access transaction, that the requested read data is provided, or that new write data should be gated in.

The logic low MCH# signal is also provided to inverter 613 and flip flop 612. The logic low MCH# signal is loaded into flip flop 612 in response to the falling edge of the CLK signal. In response to the logic low MCH# signal, inverter 613 provides a logic high signal to OR gate 615. OR gate 615, in turn, provides a logic high value to AND gate 617. The logic low MCH# signal is also applied to inverter 614. The output signal of inverter 614 is provided to an input terminal of OR gate 616. The other input terminal of OR gate 616 is coupled to receive the address strobe signal MADS#. The output terminal of OR gate 616 is coupled to the other input terminal of AND gate 617. The logic low MCH# signal ensures that OR gate 616 provides a logic high signal to AND gate 617. As a result, the RAS# signal provided by AND gate 617 is maintained at a logic high level, thereby preventing further read accesses to DRAM memory 110. Note that as long as the MCH# signal stays low, the RAS# signal remains high.

Two conditions cause the RAS# signal to be asserted low by AND gate 617. The first condition exists when the MADS# signal is low and the MCH# signal is high. During the first condition, no pending transactions are queued up. The second condition exists when the MCH# signal undergoes a transition from low to high, thereby signaling the queued up transaction is beginning to be executed.

When the address in history buffer 607 causing the match is clocked out of history buffer 607 (on the next falling edge of the CLK signal if the address causing the match was stored in register 607B, or on the second next falling edge of the CLK signal if the address causing the match was stored in register 607A), the MCH# signal transitions to a logic high value. This logic high MCH# signal is latched into flip flop 611 in response to the next rising edge of the CLK signal, thereby asserting a logic low RDY# signal and alerting the accessing device to initiate the next access. At this time, a mechanism is required to assert the RAS# signal 612 low, so as to start the execution of the queued up bank-conflict transaction whose address is stored in address latch 606. This mechanism is provided by a one-shot circuit 620, that consists of inverter 613, flip flop 612 and OR gate 615. The one-shot circuit 620 generates a negative pulse of one clock cycle on its output upon the detection of a low-to-high transition on the MCH# signal. The original logic low MCH# signal is stored in flip flop 612. When the MCH# signal goes from a low state to a high state, the output of inverter 613 becomes a logic low state. This together with the low state at the output Q of flip flop 612 causes a low state at the output of NOR gate 615. On the following falling edge of the CLK signal (the rising edge of the CLK# signal), the output Q of flip flop 612 goes high, causing the output of NOR gate 615 to go high.

The logic high MCH# signal also enables the MADS# signal to control the state of the RAS# signal. A logic high MADS# will cause the RAS# signal to remain high. Such is the case as the RDY# signal does not go low until the next rising edge of the CLK signal. The accessing client does not drive the MADS# signal low until the next clock cycle. At this time, the RAS# signal is asserted low by the output of one-shot circuit 620 until the next falling edge of the CLK signal.

Figure 7A:
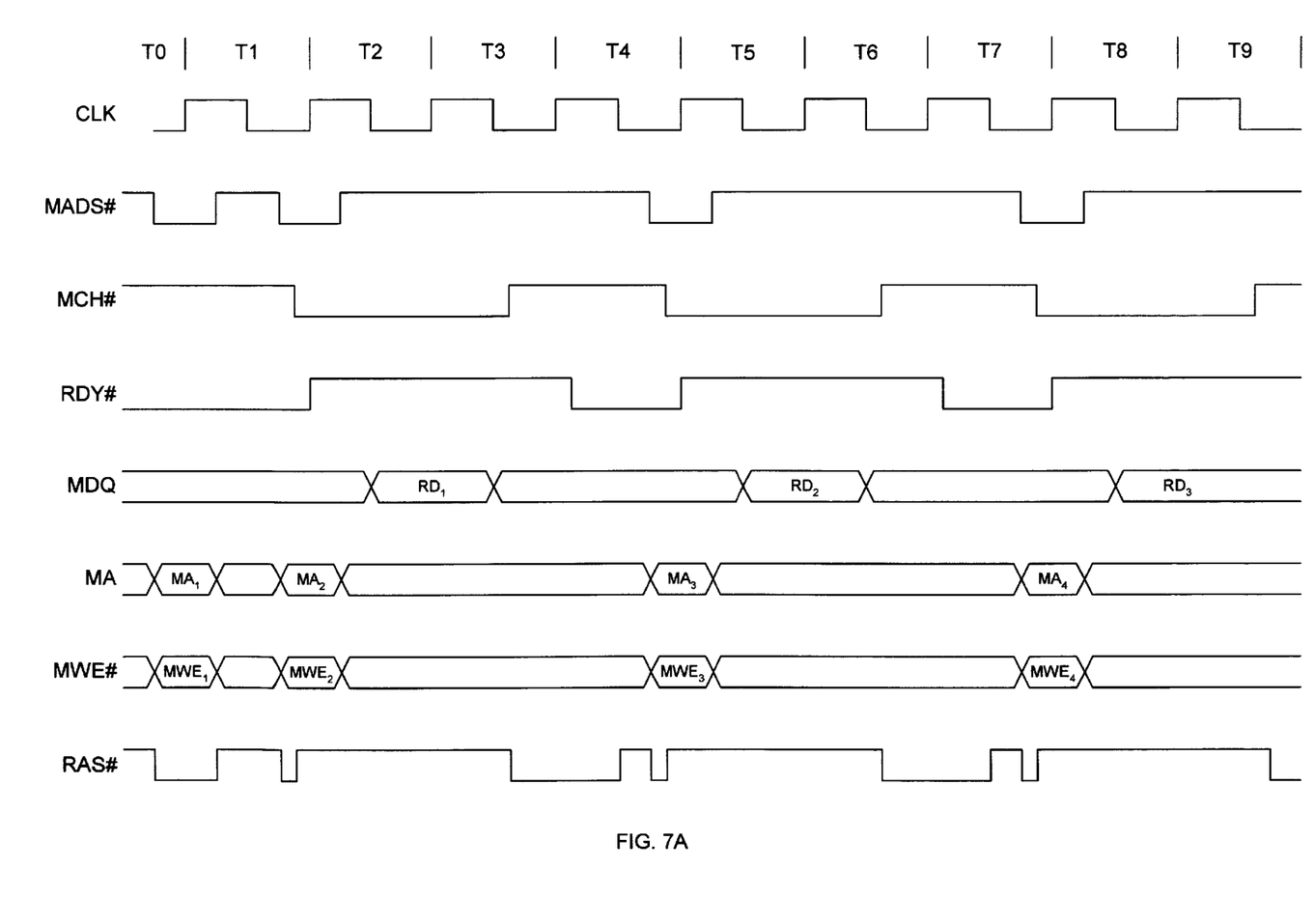
FIG. 7A is a waveform diagram illustrating various signals of the access control circuitry of FIG. 6 for four consecutive bank conflict accesses.

FIG. 7A is a waveform diagram illustrating various signals of conflict control circuit 402 for four consecutive bank conflict accesses. During clock cycle T0, memory 110 is ready to receive a new transaction, with the RDY# signal asserted low. Upon detecting the low RDY# signal, an accessing client, for example display controller 108, asserts a logic low MADS# signal, drives a first access address MA$_1$[21:6] onto address bus MA, and drives the MWE# signal to the desired state (MWE$_1$).

The low MADS# signal and the high MCH# signal results in a low LAT signal. The low LAT signal and the low CLK signal cause address latch 606 to enter a transparent state, such that the first address MA$_1$[21:6] is gated to the internal address bus as first internal address LA$_1$[21:6]. The first address MA$_1$[21:6] is latched into address latch 606 on the rising edge of the CLK signal. At this time, the upper five address bits of LA$_1$[21:17] (i.e., the bank address) are compared with the contents of registers 607A and 607B.

As described above, each of registers 607A and 607B stores an address of a bank currently being accessed. The contents of registers 607A and 607B are shifted downward on each falling edge of the CLK signal. Register 607A stores a bank address received from address latch 606 on the falling edge of the CLK signal when a new memory cycle begins, as indicated by a logic low RAS# signal. The address latched in register 607A is advanced to register 607B on the next falling edge of the clock signal, and is flushed out of register 607B on the next falling edge of the CLK signal. Therefore, the bank address of any transaction stays in history buffer 607 for two clock cycles. When there is no new transaction, as indicated by a logic high RAS# signal, the contents of register 607A are set to all high values (i.e., 11111). Since there is no bank with this address, a new bank address received from address latch 606 will not result in a match.

Returning now to the present example, it is assumed that the addressed memory bank is in the idle state at cycle T0, and the bank address associated with the addressed memory bank is not in history buffer 607. As a result, neither of comparators 608, 609 detects a match, and the MCH# signal remains high. Consequently, the RDY# signal remains low during cycle T1. The low MADS# signal and high MCH# signal cause OR gate 616 to provide a logic low signal to AND gate 617. In response, AND gate drives the RAS# signal low, thereby signaling the beginning of a memory cycle to the memory banks.

Each of the access control circuits AC$_0$–AC$_{19}$ of memory 110 compares its own unique pre-coded bank identity address with the current the bank address LA$_1$[21:6] stored in address latch 606. The access control circuit that detects a match triggers a memory access in response to the low RAS# signal and the rising edge of the CLK signal at the beginning of cycle T1. At the falling edge of the CLK signal in cycle T1, the first bank address LA$_1$[21:17] is latched in register 607A of history buffer 607. The low RDY# signal informs the accessing client that the read data is available at the end of next clock cycle T2 (illustrated as RD1 in FIG. 7A), or that the write data should be driven on the MDQ [511:0] bus at the beginning of next clock cycle T2. The low RDY# signal during clock cycle T1 also indicates to the next accessing client that a new memory transaction can begin. The next accessing client can be the same or different from the initial accessing client. For example, the client of the first transaction can be display controller 108, and the client of the second transaction can be either 2-D accelerator 102 or display controller 108.

The next accessing client begins the second transaction by driving the MADS# signal low, the MWE# signal to the desired state and the second memory address MA$_2$[21:6] on address bus MA. The second memory address MA$_2$[21:6] is routed through address latch 606 (which is transparent at this time), as second memory address LA$_2$[21:6]. The address is checked against those in the history buffer. In the example of FIG. 7A, the second memory address LA$_2$[21:6] transaction accesses the same bank as the first memory address LA$_1$[21:6]. As a result, comparator 608 detects a match between the first bank address (stored in register 607A during the first cycle T1) and the second bank address (provided by address latch 606). In response, comparator 608 asserts a logic high signal, which in turn, causes NOR gate 610 to assert a logic low MCH# signal. The logic low MCH# signal indicates that the addressed bank is busy. At the rising edge of the CLK signal at the beginning of cycle T2, the low MCH# signal is latched into flip flop 611, thereby causing the RDY# signal to be de-asserted high. The logic high RDY# signal indicates to the accessing clients that memory 110 is busy and cannot be accessed. Even though the first memory access is completed at the end of cycle T2, the memory cycle in the addressed bank is not finished until the end of cycle T3 because the memory bank takes one clock cycle to pre-charge before a new memory cycle can start. The first bank address LA$_1$[21:17] is not cleared from history buffer 607 until the falling edge of the CLK signal during cycle T3. When the first bank address LA$_1$[21:17] is cleared from history buffer 607, the MCH# signal goes high, thereby signaling that operations in the first addressed bank will be finished at the end of this cycle. The rising edge the MCH# signal causes the one-shot circuit, formed by inverter 613, flip flop 612 and OR gate 615 to drive the output of OR gate 615 low for one clock cycle. This in turn causes the RAS# signal to go low for one clock cycle. At the beginning of cycle T4, the low RAS# signal and the second address LA$_2$[21:6] cause a new memory cycle to begin.

The rising edge of the CLK signal at the beginning of cycle T4 causes the high MCH# signal to be latched into flip flop 611, thereby causing the RDY# signal to go low at the beginning of cycle T4. The logic low RDY# signal indicates that the data phase of the second transaction will occur during cycle T5 and that memory 110 is ready for another transaction. Processing then proceeds in the manner described above. Note that in FIG. 7A, it is assumed that the third and fourth accesses also result in bank conficts.

Notice that the small pulses (glitches) in the RAS# signal occurring at the ends of cycles T1, T4 and T7 do not cause any operation errors because the functionality of the RAS# signal is qualified with the rising edge of the CLK signal in access control circuits AD$_0$–AC$_{19}$.

Figure 7B:
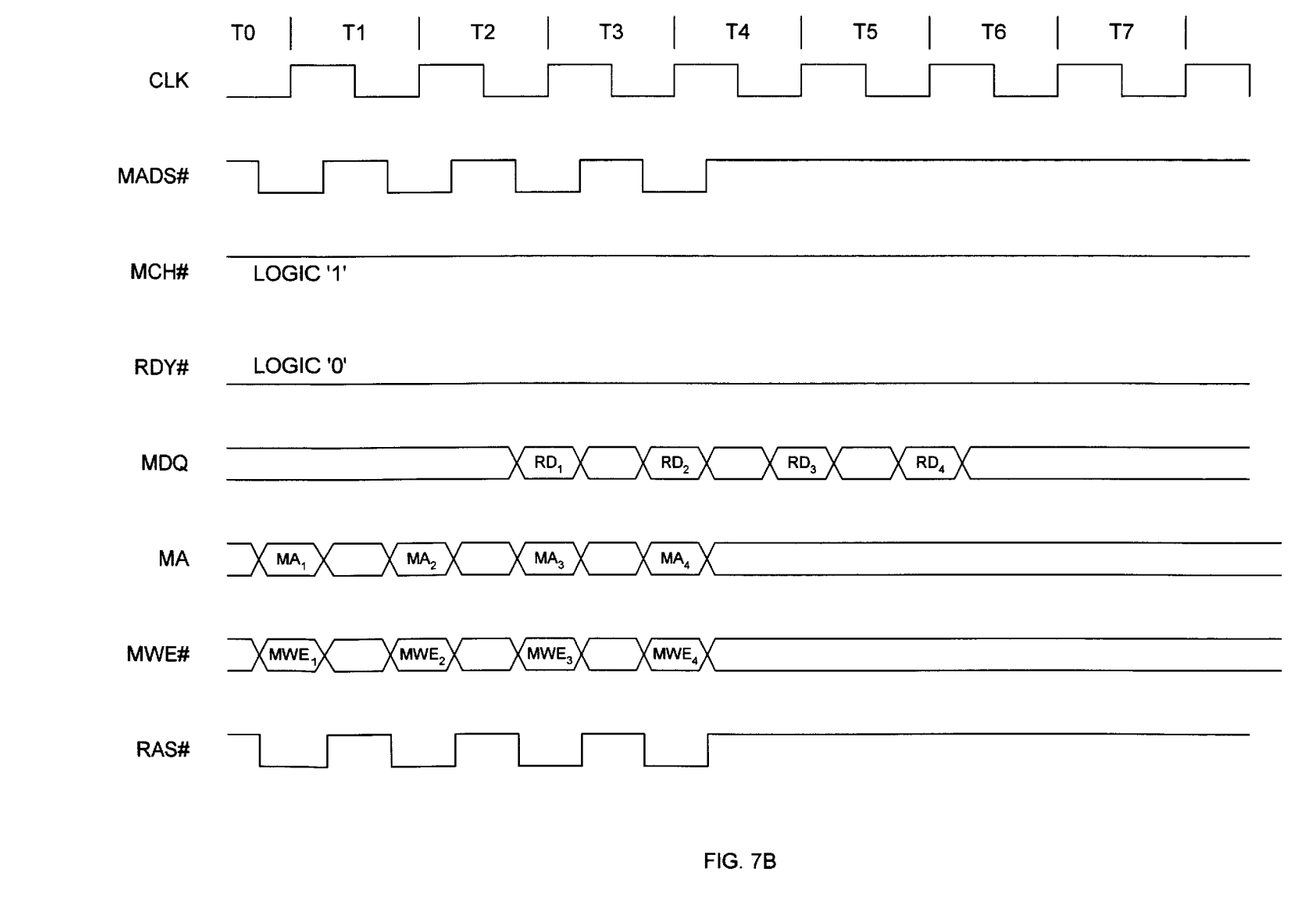
FIG. 7B is a waveform diagram illustrating various signals of the access control circuitry of FIG. 6 for four consecutive non-conflict bank accesses.

FIG. 7B is a waveform diagram illustrating various signals of conflict control circuit 402 for four consecutive non-conflict bank accesses. The first three transactions access different banks, and the fourth transaction accesses the same bank as the first transaction. Because the memory bank accessed during the first cycle T1 has completed its memory cycle at the end of cycle T3, this memory bank is able to handle the fourth transaction (which begins during cycle T4) without delay. Because the first three transactions address different banks, no bank conflict exists, and the transactions are processed in consecutive clock cycles without delay.

As shown in FIG. 7A for back-to-back accesses with bank conflict, the access time is equal to memory cycle time (3 clock cycles) plus memory access time (2 clock cycles) minus 1 clock cycle, which is equal to four clock cycles. As shown in FIG. 7B for back-to-back non-conflicting accesses, the access time is two clock cycles, but the memory can process one access per clock because of the multi-bank operation scheme. Since memory 110 has an access time varying from 2 clock cycles to 4 clock cycles, a handshake mechanism is incorporated for synchronizing the transactions and data transfers. The ready control signal RDY# is used to implement this handshake mechanism in the manner described above.

Although the invention has been described in connection with several embodiments, it is understood that this invention is not limited to the embodiments disclosed, but is capable of various modifications which would be apparent to a person skilled in the art. For example, the embedded DRAM and system memory can have different sizes in different embodiments. Similarly, the embedded DRAM can have different numbers of memory banks. Moreover, buses having different widths than those described can be used in other embodiments. Thus, the invention is limited only by the following claims.

What is claimed is:

1. A graphics sub-system fabricated on a single chip comprising:

a 2-D graphics accelerator;

a 3-D graphics accelerator; and an embedded dynamic random access memory (DRAM) coupled to the 2-D graphics accelerator and the 3-D graphics accelerator, wherein the embedded DRAM serves as a frame buffer memory or a temporary storage memory for the 2-D graphics accelerator, and wherein the embedded DRAM serves as a cache memory for the 3-D graphics accelerator.

2. The graphics sub-system of claim 1, further comprising:

a cache controller coupled to the 3-D graphics accelerator and the embedded DRAM;

a cache tag memory coupled to the cache controller; and a comparator coupled to the cache tag memory and the cache controller.

3. The graphics sub-system of claim 1, further comprising a system interface for coupling the 2-D graphics accelerator and the 3-D graphics accelerator to an off-chip system memory.

4. The graphics sub-system of claim 1, further comprising a display controller, wherein the display controller is used by both the 2-D graphics accelerator and the 3-D graphics accelerator.

5. The graphics sub-system of claim 1, further comprising a memory controller coupled to the 3-D graphics accelerator, wherein the memory controller couples the 3-D graphics accelerator to an off-chip frame buffer memory.

6. The graphics sub-system of claim 1, wherein the embedded DRAM comprises a plurality of banks.

7. The graphics sub-system of claim 6, wherein each of the banks has a separate access control circuit.

8. The graphics sub-system of claim 6, wherein the number of banks is equal to or greater than the number of clock cycles per memory cycle, such that the embedded DRAM processes one transaction per clock cycle for accesses with no bank conflicts, and the maximum memory access time for any transaction is equal to memory cycle time plus the memory access time minus 1 clock cycle.

9. The graphics sub-system of claim 8, further comprising a posted write buffer having at least two entries.

10. The graphics sub-system of claim 8, further comprising a pre-fetched read buffer having at least two entries.

11. The graphics sub-system of claim 6, wherein the embedded DRAM further comprises a history buffer for storing a plurality of previously accessed bank addresses.

12. The graphics sub-system of claim 11, further comprising a plurality of comparators for comparing a current bank address with the each of the bank addresses stored in the history buffer.

13. A graphics sub-system fabricated on a single chip comprising:

a 3-D graphics accelerator;

a central processing unit (CPU) interface coupled to the 3-D graphics accelerator, wherein the CPU interface provides an interface between the graphics sub-system and an off-chip central processing unit (CPU); and an embedded dynamic random access memory (DRAM) coupled to the 3-D graphics accelerator and the CPU interface, wherein the embedded DRAM serves as unified cache memory for the 3-D graphics accelerator and the CPU.

14. A graphics sub-system comprising an embedded dynamic random access memory (DRAM) having a number of banks equal to or greater than the number of clock cycles per memory cycle, so that the embedded DRAM processes one transaction per clock cycle for accesses with no bank conflicts and retires each transaction in the order of initiation.

15. The graphics sub-system of claim 14, wherein the maximum memory access time for any transaction is equal to memory cycle time plus the memory access time minus 1 clock cycle.

16. The graphics sub-system of claim 14, further comprising a posted write buffer having at least two entries.

17. The graphics sub-system of claim 14, further comprising a pre-fetched read buffer having at least two entries.

18. The graphics sub-system of claim 14, further comprising a read buffer and a write buffer.

19. A method of accessing a dynamic random access memory (DRAM) having a plurality of banks, the method comprising the steps of:

asserting an address and an address strobe signal to initiate a memory access to one of the banks;

comparing the address with a plurality of previously accessed addresses to determine whether the address will access the same bank as one of the previously accessed addresses, wherein the number of previously accessed addresses is selected to correspond to a number of clock cycles required for a memory cycle minus one; and if the address will access the same bank as one of the previously accessed addresses, then asserting a control signal to indicate that the DRAM is not ready to receive any further memory accesses.

20. The method of claim 19, further comprising the step of delaying the access identified by the address if the address will access the same bank as one of the previously accessed addresses.

21. The method of claim 20, further comprising the step of selecting the length of the delay in response to which of the previously accessed addresses would provide access to the same bank as the address.

22. The method of claim 19, further comprising the step of updating the plurality of previously accessed addresses every clock cycle.

* * * * *

UNITED STATES PATENT AND TRADEMARK OFFICE
CERTIFICATE OF CORRECTION

PATENT NO. : 6,215,497 B1  Page 1 of 1
DATED : April 10, 2001
INVENTOR(S) : Wingyu Leung It is certified that error appears in the above-identified patent and that said Letters Patent is hereby corrected as shown below:

<u>Title page,</u>
Item [56], References Cited, insert the following:

--      OTHER PUBLICATIONS

"NeoMagic Puts Graphics System in One Chip," by Linley Gwennap; Microprocessor Report, MicroDesign Resources, Vol. 9 (No. 3), p. 2, 3/6/1995

"An Access-Sequence Control Scheme to Enhance Random-Access Performance of Embedded DRAM's," IEEE Journal of Solid-State Circuits, Vol 33 (No. 5), p. 7, 5/12/1998

"A 32-Bank 256-Mb DRAM with Cache and TAG," IEEE Journal of Solid-State Circuits, Vol. 29, (No. 11), p. 6, 11/12/1994 --

Signed and Sealed this

First Day of April, 2003

JAMES E. ROGAN
*Director of the United States Patent and Trademark Office*